United States Patent [19]

Johansson et al.

[11] Patent Number: 4,485,309
[45] Date of Patent: Nov. 27, 1984

[54] APPARATUS FOR CONTACT-FREE SENSING OF A MOVING COHERENT MASS OF MATERIAL

[75] Inventors: Per-Olof Johansson; Folke Löfgren, both of Västerås, Sweden

[73] Assignee: ASEA AB, Västerås, Sweden

[21] Appl. No.: 335,976

[22] Filed: Dec. 30, 1981

[30] Foreign Application Priority Data

Jan. 20, 1981 [SE] Sweden ................. 8100283

[51] Int. Cl.$^3$ ........................................... G01N 21/86
[52] U.S. Cl. ..................... 250/560; 356/379
[58] Field of Search ............... 250/560, 226; 356/28, 356/384, 385, 379, 380; 350/171, 172, 173

[56] References Cited

U.S. PATENT DOCUMENTS 3,527,523  9/1970  Travis .................. 350/171

FOREIGN PATENT DOCUMENTS 1052698  3/1959  Fed. Rep. of Germany .
1923257  11/1970  Fed. Rep. of Germany .
409907   9/1979  Sweden .

OTHER PUBLICATIONS

Teknisk Tidskrift 1976:3, pp. 18–21, Mar. 1976.
Electronic Design 1970:22, p. 101, Oct. 25, 1970.

Primary Examiner—David C. Nelms
Attorney, Agent, or Firm—Pollock, Vande Sande & Priddy

[57] ABSTRACT

An apparatus for contact-free sensing of a moving coherent mass of material, for example a stream of molten glass, comprises first sensing means for producing first output signals for determining the speed of advance of the material past the sensing apparatus and second sensing means for producing a second output signal related to a dimension, e.g. the diameter, of the material transverse to its direction of advance. The sensing apparatus further includes optical means comprising a common objective lens for supplying radiation focussed from the material being sensed to both said first and second sensing means.

13 Claims, 2 Drawing Figures

APPARATUS FOR CONTACT-FREE SENSING OF A MOVING COHERENT MASS OF MATERIAL

BACKGROUND OF THE INVENTION

1. Field of the Invention

This invention relates to an apparatus for contact-free sensing of a moving coherent mass of material.

2. Description of Prior Art

Optical correlation speed measuring apparatuses are previously known, for example from the Swedish technical magazine Teknisk Tidskrift, 1976:3, pages 18–21. Such a known speed measuring apparatus comprises a sensing apparatus or transducer including a pair of photo-detectors and optical members (lenses, diaphragms or aperture plates, etc.) which collect heat and/or light radiation from the object whose speed is to be measured and supply it to the photo-detectors, and signal-processing means which receive output signals from the photo-detectors and derive a measure of the speed of the object to be measured. In particular the optical members are arranged so that the two photo-detectors continuously sense the varying surface structure of the object as it passes two measuring regions spaced apart a given distance (i.e. the "measuring base") in the direction of advance of the object. The photo-detector output signals supplied to the signal-processing means enable the latter to identify individual points on the surface of the advancing object. The signal-processing means, by calculating the time that it takes for a point on the object to pass the given measuring base, is thus able to provide a measure of the speed of advance of the object.

It is also known to determine or sense a dimension of an object optically, for example by reproducing the object, by means of an optical system on a detector comprising a number of photo-sensitive elements (photo-diodes or the like). By evaluation of the output signal or output signals of the detector, a measure is obtained of a dimension of the object, for example the diameter of an elongated object. A known dimension transducer of this kind is described, for example, in German Offenlegungsschrift No. 1, 923 257. The detector used in such a known dimension transducer may be designed, for example, as described in German Auslegeschrift No. 1 052 698 or as described in Electronic Design, Vol. 18, No. 22, Oct. 25, 1970, page 101.

Known measuring or sensing apparatuses of the two types mentioned above (i.e. speed measuring apparatus and dimension measuring apparatus) operate in a contact-free manner and are therefore suited for operation in severe environments and for measurement of, for example, moving objects having a high temperature where other methods of measurement cannot be used.

In certain cases it is desired to determine the volumetric flow through a cross-section of a moving coherent mass of material. An example of this is a process for supervising or controlling a stream of molten glass or molten metal flowing out of a container, where it may be necessary continuously to sense the flowing quantity of material per unit of time. Measurement of the volumetric flow of such a stream presents considerable problems, particularly since the measurement has to be made in a severe working environment. One problem is caused by the fact that the diameter of such a freely flowing molten glass or metal stream decreases continuously downwards. To obtain a good accuracy of measurement, it is therefore necessary to measure the diameter of the stream at the same region as where the speed measurement is made. However there are great difficulties in accomplishing this under the conditions which normally prevail in a process of this kind. If, for example, a correlation speed measuring apparatus is used, the apparatus typically has a measuring base of from 5 to 10 mm. However, since the diameter of the stream changes along the length of the stream, the diameter measurement should be made at precisely the right point within the measuring base and this adjustment must be maintained with high accuracy during the operation of the plant. In practice this is difficult or impossible to accomplish if completely separate instruments are used for the speed measurement and the diameter measurement. In addition readjustment must be carried out after removal or replacement of any of the separate measuring instruments, which results in a time-wasting service interruption.

The present invention aims to provide an apparatus for contact-free sensing of a moving coherent mass of material which is simple to use and economically favourable compared with known combined speed and dimension sensing apparatus.

SUMMARY OF THE INVENTION

According to the present invention an apparatus for contact-free sensing of a moving coherent mass of material includes optical means comprising an objective lens for focussing heat and/or light radiation collected from the moving coherent mass of material and beam dividing means for dividing the heat and/or light radiation focussed by the objective lens into a first beam and a second beam, first sensing means arranged in the path of said first beam for producing first output signals for determining the speed of advance of the coherent mass of material past the sensing apparatus, and second sensing means arranged in the path of said second beam for producing a second output signal related to a dimension of the moving coherent mass of material transverse to its direction of advance.

Thus in a sensing apparatus according to the invention a single objective lens is employed for both the first and second sensing means resulting in a saving in cost over known apparatus employing separate objective lenses for separate speed and dimension measuring or sensing devices. By using a single objective lens, the said dimension, e.g. diameter, of the coherent mass of material may be sensed accurately relative to, e.g. within, a measuring base employed for sensing the coherent mass of material for determining the speed of the latter relative to the sensing apparatus.

Conveniently the sensing apparatus is housed in a single unit. Typically at least part of the second sensing means is adjustably mounted for adjusting the position where the said dimension is sensed in relation to the location where the coherent mass of material is sensed for determining the speed of advance of the coherent mass of material.

BRIEF DESCRIPTION OF THE DRAWINGS

The invention will now be described, by way of example, with reference to the accompanying drawings, in which.

DESCRIPTION OF PREFERRED EMBODIMENTS

Figures 1, 2:
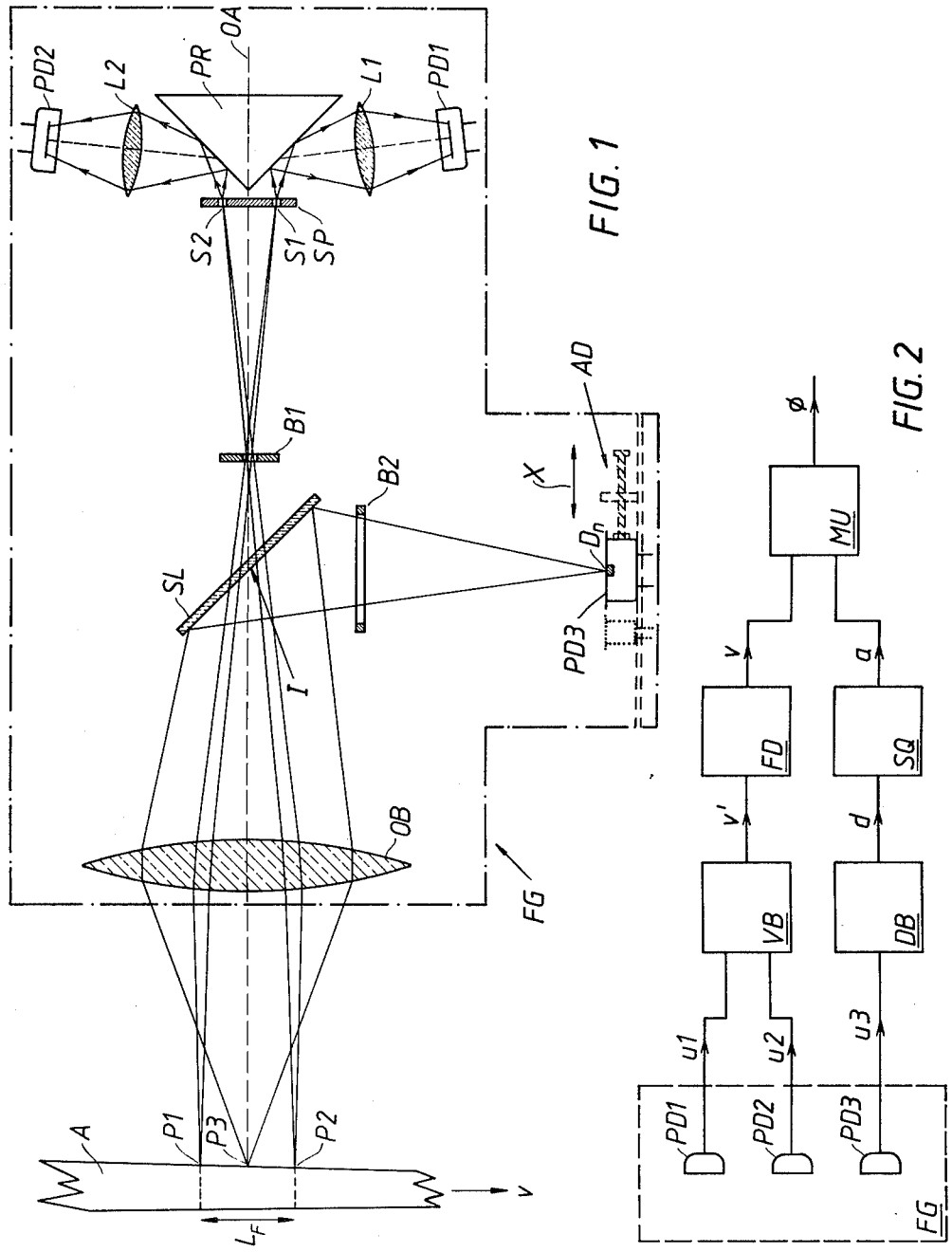
FIG. 1 is a schematic side view of sensing apparatus according to the invention shown sensing a moving mass of coherent material.
FIG. 2 is a block diagram of signal processing means, for use with the sensing apparatus shown in FIG. 1, for generating a signal proportional to volumetric flow of the moving mass of coherent material.

FIG. 1 shows a sensing apparatus, according to the invention, arranged for sensing the speed and a diameter of a coherent mass of material moving in a stream A past the measuring apparatus at a speed v. By way of example in the ensuing description it will be assumed that the stream A is a stream of hot molten glass, of circular cross-section, flowing out of a container (not shown). The hot glass stream emits natural radiation (mainly heat radiation but also some light radiation) which is captured by an objective lens OB having an optical axis OA. Behind the objective lens OB there is arranged a beam divider in the form of a semi-transparent mirror SL which deflects part of the radiation sidewards in a beam towards a diaphragm or aperture plate B2 and a detector PD3 which are used for measuring the diameter of the stream A. The part of the radiation which is not reflected by the semi-transparent mirror SL continues in a beam towards a diaphragm B1 located in the focal plane of the objective lens OB. The diaphragm B1 may be a simple aperture diaphragm, but to increase the amount of radiation passing through the diaphragm it may be suitable to construct the diaphragm as an elongated slit with its longitudinal axis perpendicular to the plane of the paper. Spaced behind the diaphragm B1 on the axis OA there is a slit plate SP having two elongated slots S1 and S2 with their longitudinal axes perpendicular to the plane of the paper. Conveniently, for example, the slits each have a width of 0.8 mm and are mutually spaced apart a distance of 4 mm. The distances between the stream A and the objective lens OB and between the objective lens OB and the slit plate SP are chosen such that the objective lens depicts the stream A in the plane of the slit plate SP. Thus a point P1 on the stream A is represented as a point in the slit S1 and a point P2 on the stream A is represented as a point in the slit S2.

The diaphragm B1 cuts away all the rays emitted from the stream A except those rays which, between the stream A and the objective lens OB, are approximately parallel to the optical axis OA. This results in a reduced sensitivity to variations in the distance between the stream A and the objective lens OB. The increased depth of field caused by the diaphragm B1 also contributes to this.

The radiation from the slits S1 and S2 passes via a reflecting prism PR and lenses L1 and L2 to radiation detecting means in the form of photo-detectors PD1 and PD2, which typically consist of photo-diodes. The lenses L1 and L2 may suitably be arranged so that they reproduce the diaphragm B1 on the active surfaces of the photo-detectors. The output signal from the photo-detector PD1 corresponds to the radiation which is emitted from the stream A at a line, perpendicular to the paper, through the point P1 and the output signal from the photo-detector PD2 corresponds to the radiation which is emitted from the stream A at a line, perpendicular to the paper, through the point P2. The radiation from the surface of the stream A shows variations between different points on the surface. These variations cause the output signals from the photo-detectors PD1 and PD2 to vary with time. It will be appreciated that the output signals from photo-detector PD2 will be substantially similar to the output signals from the photo-detector PD1 although they will be displaced by a time $\tau_F$ corresponding to the time it takes for a point on the surface of the stream A to travel the measuring base $L_F$ (i.e. the distance between the points p1 and p2). Since $L_F$ is known for the sensing apparatus and since $\tau_F$ can be calculated by supplying the output signals from the two photo-detectors PD1 and PD2 to signal processing means, the speed v of the stream A can be determined from the following equation:

$$v = \frac{L_F}{\tau_F}$$

The radiation which is deflected by the mirror SL continues in a converging beam towards a diaphragm B2. The diaphragm B2 is arranged perpendicular to the path of the reflected beam and its centre is positioned the same distance from the point of intersection I of the optical axis OA with the reflecting surface of the mirror SL as the centre of the diaphragm B1 is positioned from the point of intersection I. The diaphragm B2 has an elongated slit, with its longitudinal axis in the plane of the paper, and provides the same effect as the diaphragm B1 described above. The radiation passes through the diaphragm in a converging beam towards a radiation detector in the form of a photo-detector PD3, which is positioned such that points P3 along a line, which is perpendicular to the direction of movement of the stream A, on the surface of the stream are reproduced on the photo-detector PD3. The photo-detector PD3 is suitably constructed, in a manner known per se, with an array of photo-diodes $D_n$ (one of which is shown schematically in FIG. 1) which are arranged along a line perpendicular to the plane of the paper. By sensing which, or how many, diodes are hit by the natural radiation emitted from the stream A of molten glass, the diameter of the stream A may be determined in a manner known per se.

The diameter measure thus obtained corresponds to the diameter of the stream A at points P3. By displacing the photo-detector PD3 in the lateral direction (i.e. in the directions of the arrows X in FIG. 1), the position of the points P3 sensed by the photo-detector PD3 may be displaced in the longitudinal direction (i.e. direction of advance) of the stream A. For example, in the case where the sensing apparatus is used for determining the volumetric flow of the stream A, it is essential that the downwardly continuously decreasing diameter of the stream A is measured at the right location, i.e. at the point where the diameter corresponds to the average speed between points P1 and P2 measured by the speed measuring apparatus. If the photo-detector PD3 is provided with a suitable adjusting means AD (shown schematically in dashed lines in FIG. 1 as an adjusting screw although any other suitable form of adjusting means may be employed) the location of the points P3 may be adjusted with high accuracy relative to, e.g. within, the measuring base $L_F$. All the units and components shown in FIG. 1 are suitably built into, and housed in, one mechanical unit FG (see chain lines in FIG. 1). The adjustment of the photo-detector PD3 can then be carried out at a factory or at a service workshop, and no adjustment is required during mounting or when replacing a defective apparatus unit or component by a new or repaired apparatus unit or component. In this way a high accuracy of measurement is obtained and maintained. During service work faulty units or components can be replaced in a simple and rapid manner without time-wasting adjustment being required. Further, the optic system which is partially in common for the two measuring or sensing apparatuses results in a considerable reduction in cost as compared with two completely separate measuring apparatuses for measuring speed and diameter, respectively.

FIG. 2 shows schematically an example of how the output signals from the photo-detectors PD1, PD2 and PD3 of the sensing apparatus according to the invention can be used for determining the volumetric flow of the stream A in FIG. 1. The sensing apparatus comprising the optical members shown in FIG. 1 as well as the three photo-detectors PD1, PD2 and PD3, are shown in FIG. 2 housed in the single unit FG (shown in dashed lines). From the outputs of the detectors PD1 and PD2 output signals u1 and u2 are obtained, where output signal u2 is delayed by the time $\tau_F$ relative to output signal u1. By determining the magnitude of this time delay, the speed of the stream A can be calculated in the manner described above. Conveniently the speed calculation is performed in a calculating circuit VB, which may be designed according to the Swedish Published Patent Application No. 409,907. From the output of the circuit VB there is obtained a pulse train v', the pulse frequency of which is proportional to the speed of the stream A. In a frequency-digital converter circuit FD, the pulse train is converted into a digital signal which corresponds to the speed v of the stream A.

From the photo-detector PD3 there is obtained one or more output signals u3 (e.g. one from each photodiode) which are converted in a calculating circuit DB into a digital signal d corresponding to the diameter of the stream A. In a squaring circuit SQ the signal d is squared whereupon a signal a is obtained which is representative of the cross-sectional area of the stream A at the points P3. In a multiplying circuit MU the signals v and a are multiplied together and their product $\phi$ is a measure of the volumetric flow of the stream A, i.e. of the volume which per unit of time passes through a cross-section of the stream.

In most cases it will be desirable to carry out the diameter sensing along a line (points P3) located within the measuring base $L_F$ (i.e. the length from P1 to P2) of the correlation measurement, which line is perpendicular to the direction of movement of the stream A. Alternatively, however, the diameter sensing can be carried out at a location situated outside the measuring base $L_F$, in which case the measured value may be corrected, if necessary, so that the diameter at the desired location is obtained.

The signal processing apparatus constituted by the circuits VB, FD, DB, SQ and MU are conveniently provided in a single unit connectible to, and disconnectible from, the unit FG. However, if the components of the sensing apparatus are not contained in a single unit FG, it is possible for the signal processing apparatus and the sensing apparatus to be combined as a single unit.

Instead of having a single, adjustably movable photo-detector PD3, it is possible to have at least two fixed radiation detectors (one of which is shown in dotted lines in FIG. 1) for sensing the diameter of the stream A at different locations therealong. In this case the resulting diameter of the stream A can be calculated as the mean value of the measured diameters or as any other suitable function thereof. For example, two detectors may be provided for determining the diameter of the stream, one at each end of the measuring base.

To increase the accuracy of the diameter sensing, the mean value of the diameter over a specified time (the time mean value) can be formed and used, for example, for calculating the flow according to FIG. 2.

Instead of a slit, the diaphragm B2 may alternatively be provided with a hole. However, the above-described embodiment as a slit diaphragm is often preferable because of its greater light transmission.

If the active surface of the photo-detector PD3 has a relatively great extension in the plane of the paper in FIG. 1 and perpendicularly to the incident radiation, a diaphragm may be arranged in front of the photo-detector PD3. In this case, the diaphragm is constructed with a narrow gap with its longitudinal axis perpendicular to the plane of the paper. By displacing the diaphragm, alone or together with the detector PD3, in the direction of the arrows in FIG. 1, the location of the point P3 may be adjusted.

The foregoing description describes how the invention is applied to a glass stream of circular cross-section, the sensed dimension of the stream A being its diameter. In case of moving coherent masses of material having other shapes, however, some other dimension may be sensed. For example the thickness of a moving coherent mass of material of rectangular cross-section and known width may be sensed. The invention can also be applied to contact-free sensing of moving solid coherent masses of material, for example a wire or rod moving past the sensing apparatus, instead of being applied to sensing liquid or molten coherent masses of material.

If the moving coherent mass of material being sensed is not sufficiently hot as to give off sufficient natural heat (infrared) radiation, the moving material can be illuminated and the reflected light used for determining the speed and a dimension, e.g. diameter, of the moving material.

The above description, with reference to FIG. 2, describes how the output signals from a sensing apparatus according to the invention are used to calculate the volumetric flow of a stream of molten glass. However, the output signals used for determining speed and diameter of the stream can be used for other purposes as well.

The specific embodiments of sensing apparatus, according to the invention, described above may be modified in many ways within the scope of the following claims.

What is claimed is:

1. An apparatus for contact-free sensing of a moving coherent mass of material including:
   optical means comprising an objective lens for focussing heat and/or light radiation collected from the moving coherent mass of material and beam dividing means for dividing the heat and/or light radiation focussed by the objective lens into a first beam and a second beam,
   first sensing means arranged in the path of said first beam for producing first output signals for determining the speed of advance of the coherent mass of material past the sensing apparatus,
   second sensing means arranged in the path of said second beam for producing a second output signal related to a dimension of the moving coherent mass of material transverse to its direction of advance,
   first diaphragm means positioned between said beam dividing means and said first sensing means to prevent passage of at least part of that portion of said first beam which emanates from radiation emitted and/or reflected from the material being sensed towards said objective lens in directions which are not at least approximately parallel to the optical axis of said objective lens, and, second diaphragm means positioned between said beam dividing means and said second sensing means to prevent passage of at least part of that portion of said second beam which emanates from radiation emitted and/or reflected from the material being sensed towards said objective lens in directions which are not at least approximately parallel to the optical axis of said objective lens.

2. Sensing apparatus according to claim 1, in which the first sensing means comprises optical members for sensing the moving coherent mass of material at two regions, spaced a predetermined distance apart in the direction of advance of the coherent mass of material, and defining therebetween a predetermined measuring base.

3. Sensing apparatus according to claim 2, in which the said second sensing means is arranged to sense the said dimension of moving coherent mass of material at a measuring location located within the said measuring base.

4. Sensing apparatus according to claim 3, in which the said second sensing means is provided with means for displacing and adjusting the position of the measuring location within the measuring base.

5. Sensing apparatus according to claim 3, in which the said second sensing means includes at least two sensing members arranged to sense the said dimension of the moving coherent mass of material at at least two different measuring locations spaced apart in the direction of advance of the moving coherent mass of material.

6. Sensing apparatus according to claim 1, in which the second sensing means comprises an array of separate or mutually integrated photo-diodes.

7. Sensing apparatus according to claim 1, in which the first diaphragm means is arranged in the focal plane of the objective lens.

8. Sensing apparatus according to claim 1, in which the first diaphragm means comprises a slit diaphragm oriented in such a way as to let through, in use, radiation from points along lines on the surface of the material being sensed which are perpendicular to the direction of movement of the material.

9. Sensing apparatus according to claim 1, in which the second diaphragm means comprises a slit diaphragm arranged so as to let through, in use, radiation from points along lines on the surface of the material being sensed which are parallel to the direction of movement of the material.

10. Sensing apparatus according to claim 1, in which the first sensing means includes scanning elements for enabling the moving coherent mass of material to be scanned at two locations spaced apart a predetermined distance in the direction of movement of the mass of material and detecting means for generating two of said first output signals which reflect variations in surface structure of the coherent mass of material at said two locations.

11. Measuring apparatus comprising sensing apparatus according to claim 10 and signal processing means including means for correlating said two first output signals and determining the time delay therebetween and means for using the determined time delay and the said known predetermined distance between said two scanning locations for providing a speed signal representative of the speed of the moving coherent mass of material.

12. Measuring apparatus according to claim 11, in which the signal processing means further includes means adapted to receive said speed signal and said second output signal and to generate therefrom a further output signal which is a measure of the volumetric flow of the said material past the sensing apparatus.

13. An apparatus for contact-free measuring of the volumetric flow of a moving mass of material comprising:

optical means including an objective lens for collecting and focusing along a common optical path radiation emitted and/or reflected from a moving coherent mass of material, and beam dividing means for dividing into a first beam and a second beam said radiation focused along a common optical path by said objective lens, first signal means for providing in response to said first beam an output signal representative of the speed of said moving coherent mass of material in a direction of its movement, second signal means for providing in response to said second beam an output signal representative of a cross-sectional area of said coherent mass of material in a direction transverse to said direction of movement, and, signal processing means for providing in response to said speed representative signal and said cross-sectional area representative signal a further output signal representative of the volumetric flow of said coherent mass of material.

* * * * *